(12) United States Patent
Patel et al.

(10) Patent No.: US 10,778,520 B2
(45) Date of Patent: Sep. 15, 2020

(54) HYPER-CONVERGED INFRASTRUCTURE CORRELATION SYSTEM

(71) Applicant: Dell Products L.P., Round Rock, TX (US)

(72) Inventors: Dharmesh M. Patel, Round Rock, TX (US); Rizwan Ali, Cedar Park, TX (US); Ravikanth Chaganti, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 16/258,469

(22) Filed: Jan. 25, 2019

(65) Prior Publication Data
US 2020/0244521 A1   Jul. 30, 2020

(51) Int. Cl.
| | |
|---|---|
| H04L 12/24 | (2006.01) |
| G06F 9/50 | (2006.01) |
| G06F 11/30 | (2006.01) |
| G06F 9/455 | (2018.01) |
| G06F 11/34 | (2006.01) |

(52) U.S. Cl.
CPC ........ *H04L 41/082* (2013.01); *G06F 9/45558* (2013.01); *G06F 9/5011* (2013.01); *G06F 9/5027* (2013.01); *G06F 11/3062* (2013.01); *G06F 11/3409* (2013.01); *H04L 41/0856* (2013.01); *H04L 41/0893* (2013.01); *G06F 2209/501* (2013.01); *G06F 2209/503* (2013.01); *G06F 2209/5021* (2013.01)

(58) Field of Classification Search
CPC . G06F 9/45558; H04L 41/12; H04L 41/0803; H04L 41/0813; H04L 41/082; H04L 41/0853
See application file for complete search history.

(56) References Cited

U.S. PATENT DOCUMENTS

| | | | |
|---|---|---|---|
| 9,325,688 B1 * | 4/2016 | Hansen | H04L 67/1097 |
| 9,626,211 B2 * | 4/2017 | Riewrangboonya | G06F 9/45558 |
| 10,078,465 B1 * | 9/2018 | Wu | G06F 3/061 |

(Continued)

*Primary Examiner* — Sargon N Nano
(74) *Attorney, Agent, or Firm* — Haynes and Boone, LLP

(57) ABSTRACT

A Hyper-Converged Infrastructure (HCI)/physical infrastructure correlation system includes a compute/networking/storage physical infrastructure system coupled to an HCI correlation system via a network. The HCI correlation system retrieves physical device information about respective physical devices included in the compute/networking/storage physical infrastructure system, as well as performance capability information of the respective physical devices included in the compute/networking/storage physical infrastructure system. The HCI correlation system then accesses an HCI component database, and uses the physical device information and the performance capability information to identify a plurality of HCI components that are configurable as an HCI system to perform functionality that is provided by the respective physical devices included in the compute/networking/storage physical infrastructure system. The HCI correlation system then causes at least one HCI software component included in the plurality of HCI components to be provided on at least one HCI physical component included in the plurality of HCI components.

20 Claims, 15 Drawing Sheets

(56) References Cited

U.S. PATENT DOCUMENTS

| | | | |
|---|---|---|---|
| 10,169,064 B2* | 1/2019 | Riewrangboonya | G06F 9/45558 |
| 10,476,951 B2* | 11/2019 | Gakhar | H04L 43/0817 |
| 2014/0280489 A1* | 9/2014 | Nandyalem | G06F 11/3006 709/203 |
| 2015/0312104 A1* | 10/2015 | Riewrangboonya | H04L 41/12 709/224 |
| 2019/0007369 A1* | 1/2019 | Nirwal | H04L 61/103 |
| 2019/0087278 A1* | 3/2019 | Almog | G06F 8/41 |
| 2019/0340005 A1* | 11/2019 | Mace | G06F 9/45558 |
| 2020/0019841 A1* | 1/2020 | Shaabana | G06F 9/505 |
| 2020/0133657 A1* | 4/2020 | Yan | G06F 8/658 |

* cited by examiner

HYPER-CONVERGED INFRASTRUCTURE CORRELATION SYSTEM

BACKGROUND

The present disclosure relates generally to information handling systems, and more particularly to correlating a Hyper-Converged Infrastructure (HCI) system with an existing information handling system physical infrastructure.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A growing trend with information handling systems is to replace traditional physical information handling system infrastructures with software-defined information handling system infrastructures. For example, traditional physical information handling system infrastructures typically include physical server device(s), physical networking devices (e.g., physical switch devices), and physical storage devices, and can be replaced by software-defined information handling system infrastructures such as Hyper-Converged Infrastructure (HCI) systems that utilize physical server devices to provide software-defined entities that perform the compute, networking, and storage functionality provided by the physical devices included in the traditional physical information handling system infrastructures. The use of HCI systems tend to reduce costs associated with traditional physical information handling system infrastructures, while offering flexibility and on-demand scaling of the infrastructure with little to no disruptions the services provided by those infrastructures. However, HCI systems are configurable from a wide variety of HCI components in order to provide different solutions having a variety of resiliency levels, supported configurations, and node requirements that enable desired levels of capacity and scale points. As the number of HCI system components available to provide HCI systems grows, it become increasingly difficult to correlate HCI system needs with any particular traditional physical information handling system infrastructure in order to provide an HCI system that meets the requirements of that traditional physical information handling system infrastructure while also providing an optimal configuration and cost of that HCI system.

Accordingly, it would be desirable to provide an HCI correlation system.

SUMMARY

According to one embodiment, an Information Handling System (IHS) includes a processing system; and a memory system that is coupled to the processing system and that includes instructions that, when executed by the processing system, cause the processing system to provide an HCI correlation engine that is configured to: retrieve, through a network from a compute/networking/storage physical infrastructure system, physical device information about respective physical devices included in the compute/networking/storage physical infrastructure system; retrieve, through the network from the compute/networking/storage physical infrastructure system, performance capability information of the respective physical devices included in the compute/networking/storage physical infrastructure system; access, via an HCI component database, HCI component information; identify, from the HCI component information and using the physical device information and the performance capability information, a plurality of HCI components that are configurable as an HCI system to perform functionality that is provided by the respective physical devices included in the compute/networking/storage physical infrastructure system; and cause, in response to identifying the plurality of HCI components; at least one HCI software component included in the plurality of HCI components to be provided on at least one HCI physical component included in the plurality of HCI components.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
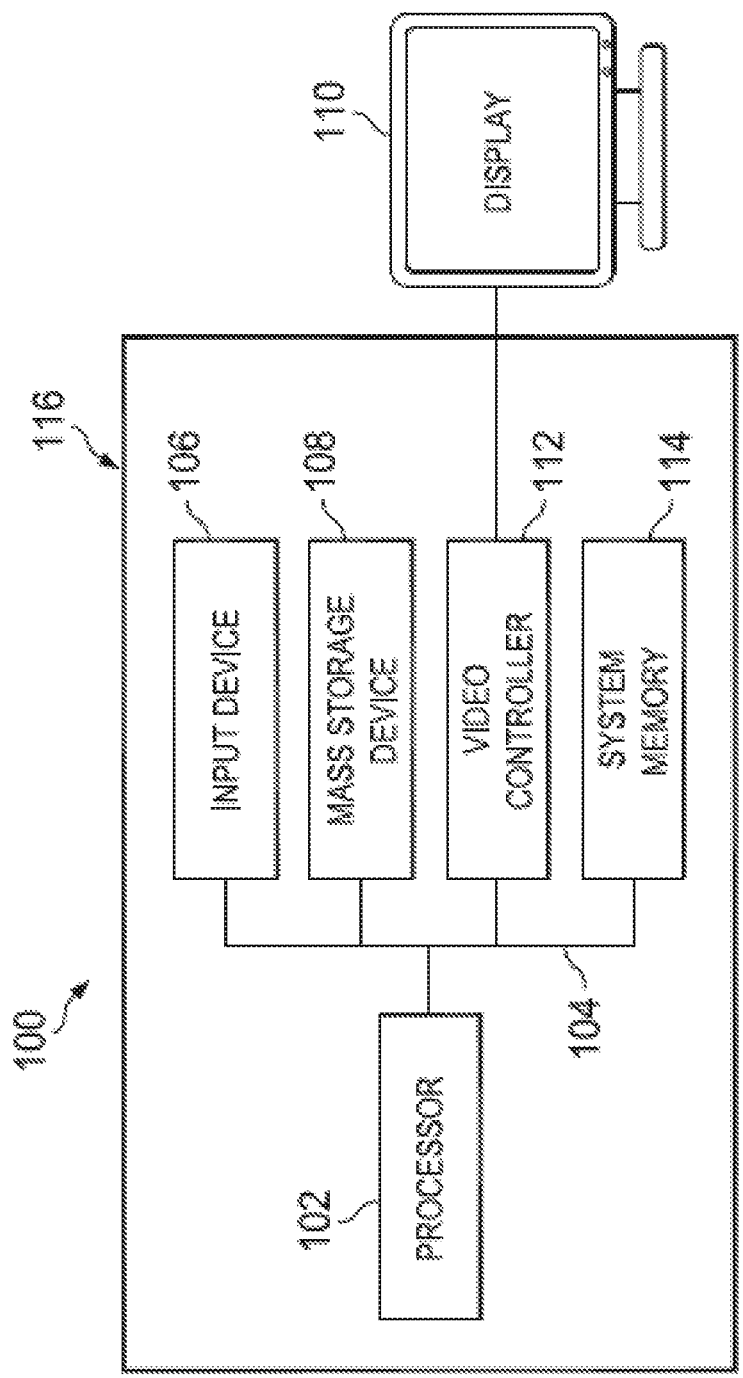
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
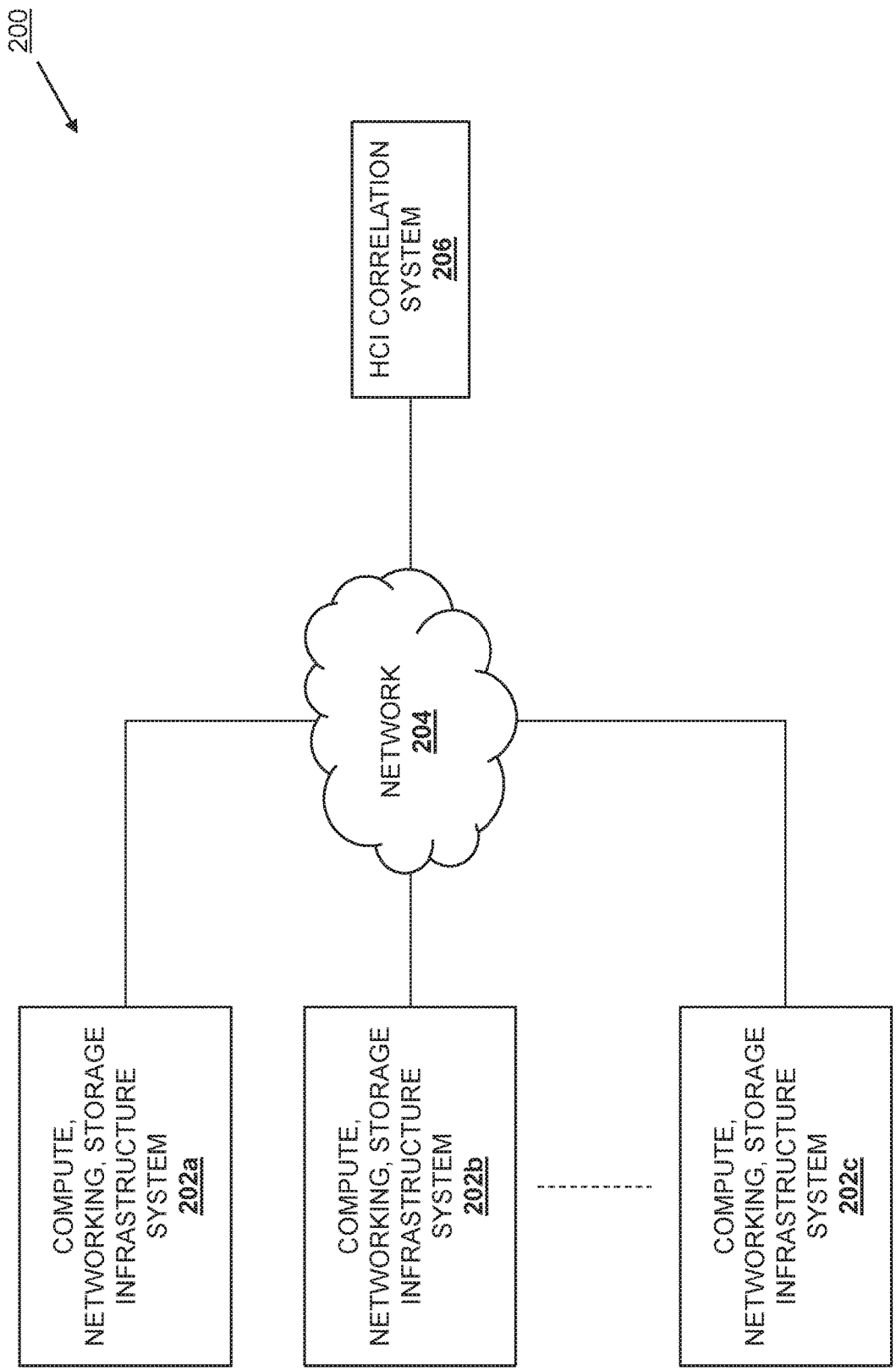
FIG. 2 is a schematic view illustrating an embodiment of a Hyper-Converged Infrastructure (HCI) correlation system coupled to computer/networking/storage infrastructure systems.

Referring now to FIG. 2, an embodiment of a networked system 200 is illustrated. In the illustrated embodiment, the networked system 200 includes a plurality of compute/networking/storage infrastructure systems 202a, 202b, and up to 202c. For example, any or all of the compute/networking/storage infrastructure systems 202a-c may be provided by traditional physical information handling system infrastructures that typically include physical server device(s), physical networking devices (e.g., physical switch devices), and physical storage devices that have been interconnected and configured (e.g., via software) to perform a variety of tasks desired by the user of that computer, networking, and storage infrastructure system. As such, any of the compute/networking/storage infrastructure systems 202a-c may include one or more IHSS similar to the IHS 100 discussed above with reference to FIG. 1, and/or including some or all of the components of the IHS 100. In specific examples, any of the compute/networking/storage infrastructure systems 202a-c may be provided by server device(s), networking device(s), and storage device(s) housed in one or more racks. However, one of skill in the art in possession of the present disclosure will recognize that compute/networking/storage infrastructure systems 202a-c provided via traditional physical information handling system infrastructures may include a variety of different components in a variety of different component configurations while remaining within the scope of the present disclosure as well.

In the illustrated embodiment, each of the compute/networking/storage infrastructure systems 202a-c are coupled to a network 204, which may be provided by a Local Area Network (LAN), the Internet, and/or other networks known in the art. In the examples below, each of the compute/networking/storage infrastructure systems 202a-c may be controlled by different users, although other embodiments may provide the multiple compute/networking/storage infrastructure systems 202a-c illustrated in FIG. 2 controlled by a single user. An HCI correlation system 206 is coupled to the network 204, and may be provided by the IHS 100 discussed above with reference to FIG. 1, and/or may include some or all of the components of the IHS 100. In specific examples, the HCI correlation system may be provided by a plurality of server devices, although the use of other components for providing the HCI correlation system 206 is envisioned as falling within the scope of the present disclosure as well.

While a specific networked system 200 has been described, one of skill in the art in possession of the present disclosure will recognize that a variety of infrastructure systems may benefit from the HCI correlations discussed below, and those infrastructure systems will fall within the scope of the present disclosure as well. Furthermore, while the correlation of HCI systems with compute/networking/storage infrastructure systems is illustrated and described below, one of skill in the art in possession of the present disclosure will recognize how the systems and methods described herein may be utilized to correlate Converged Infrastructure (CI) systems (e.g., all-in-one physical infrastructure systems including compute devices, networking devices, and storage devices) with existing compute/networking/storage infrastructure systems while remaining within the scope of the present disclosure as well. Furthermore, while the provisioning of HCI systems that provide functionality available from the compute/networking/storage infrastructure systems is described below, the provisioning of HCI systems or CI systems for new functionality, or the expansion of existing functionality, will fall within the scope of the present disclosure as well.

Figure 3:
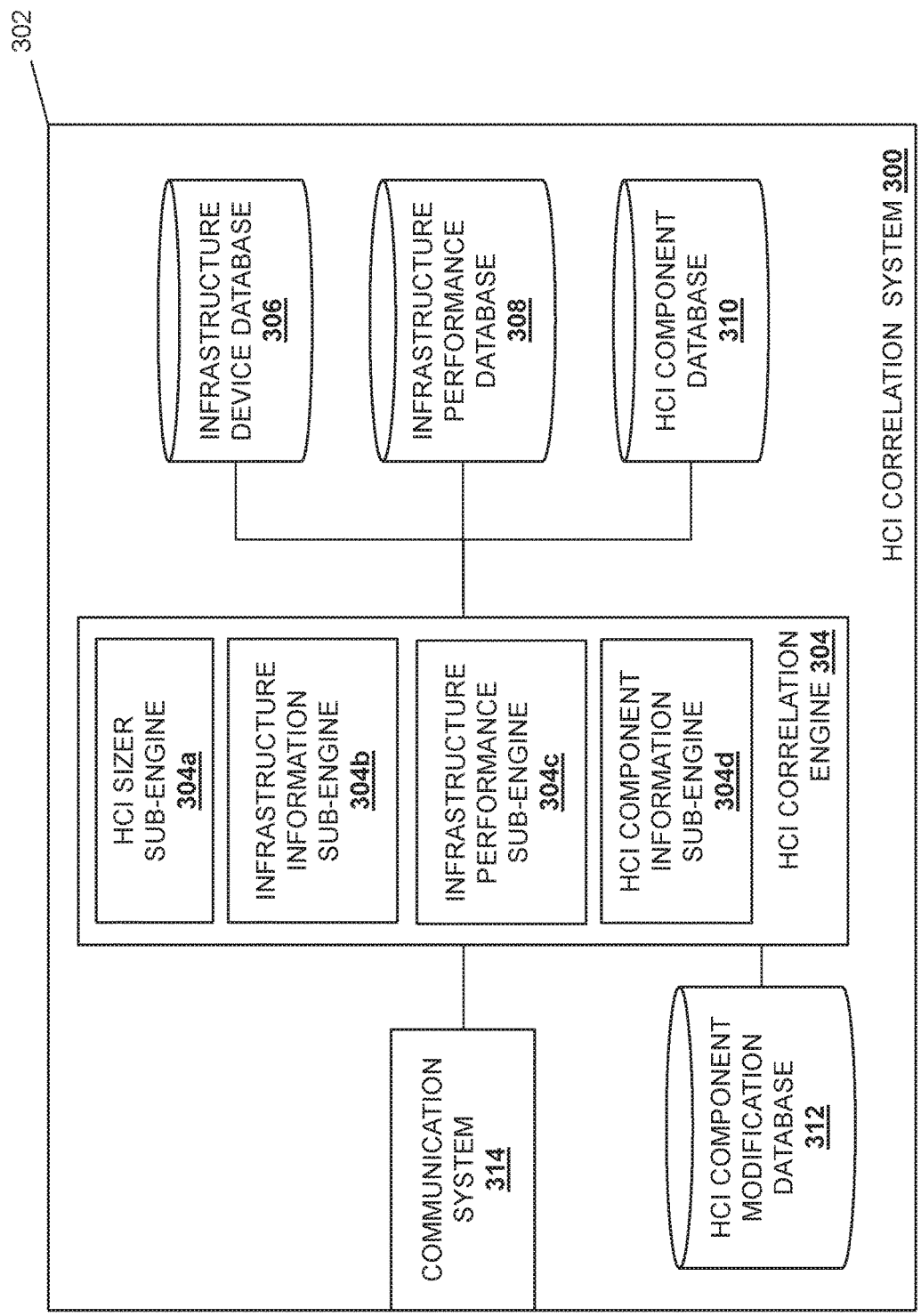
FIG. 3 is a schematic view illustrating an embodiment of the HCI correlation system included in FIG. 2.

Referring now to FIG. 3, an embodiment of an HCI correlation system 300 is illustrated that may provide the HCI correlation system 206 discussed above with reference to FIG. 2. As such, the HCI correlation system 300 may be provided by the IHS 100 discussed above with reference to FIG. 2, may include some or all of the components of the IHS 100, and in specific embodiments may be provided by one or more server devices. In the illustrated embodiment, the HCI correlation system 300 includes a chassis 302 that houses the components of the HCI correlation system 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an HCI correlation engine 304 that is configured to perform the functions of the HCI correlation engines and HCI correlation systems discussed below.

As discussed in further detail below, the HCI correlation engine 304 may be configured to perform data collection, data analytics, HCI component identification, HCI component modification analysis, and/or any of the other HCI correlation functionality discussed below. In some of the specific examples below, the HCI correlation engine 304 is configured to utilize formulas and/or algorithms that specify and apply weightings and/or prioritizations to variety HCI component parameters that drive the identification of HCI components in order to provide for the creation of an HCI system that provides required and/or desired capabilities while also conforming to HCI component positioning strategies. As would be understood by one of skill in the art in possession of the present disclosure, HCI component positioning strategies may influence the HCI component identifications made via the HCI component identification algorithm discussed below, and may be defined by an HCI provider to position or prioritize HCI components for identification based on, for example, current system requirements, component quotas, and component provider partnering, and/or any other component positioning strategy factors that would be apparent to one of skill in the art in possession of the present disclosure. Furthermore, the modification of identified HCI components for providing any particular HCI system may be captured and analyzed to identify when the weighting/prioritizations of HCI components in the formulas and/or algorithms discussed herein should be changed in order to direct the identification of HCI components for HCI systems created in the future.

In the specific example illustrated in FIG. 3, the HCI correlation engine 304 includes an HCI sizer sub-engine 304a that is configured to perform the functions of the HCI sizer engines, HCI correlations engines, and HCI correlation systems discussed below; an infrastructure information sub-engine 304b that is configured to perform the functions of the infrastructure information engines, HCI correlations engines, and HCI correlation systems discussed below; an infrastructure performance sub-engine 304c that is configured to perform the functions of the infrastructure performance engines, HCI correlations engines, and HCI correlation systems discussed below; and an HCI component information sub-engine 304d that is configured to perform the functions of the HCI component information engines, HCI correlations engines, and HCI correlation systems discussed below. However, while specific sub-engines are illustrated in FIG. 3 and described as providing specific functionality below, any of the functionality discussed below may be provided by the HCI correlation engine 304 and/or HCI correlation system 300 while remaining within the scope of the present disclosure as well.

The chassis 302 may also house a storage system (not illustrated, but which may include the storage device 108 discussed above with reference to FIG. 1) that is coupled to the HCI correlation engine 304 (e.g., via a coupling between the storage system and the processing system) and that may include databases that store any of the information utilized by the HCI correlation engine 304 as discussed below. For example, in the illustrated embodiment, the storage system includes an infrastructure device database 306, an infrastructure performance database 308, an HCI component database 310, and an HCI component modification database 312. However, while particular databases are described as storing particular information below, one of skill in the art in possession of the present disclosure will recognize that the storage system may store any of the information utilized by the HCI correlation engine 304 as discussed below in any of a variety of manners that will fall within the scope of the present disclosure as well. The chassis 302 may also house a communication system 314 that is coupled to the HCI correlation engine 304 (e.g., via a coupling between the communication system 314 and the processing system) and that may be provided by a Network Interface Controller (NIC), a wireless communication subsystem (e.g., a BLUETOOTH® subsystem, a Near Field Communication (NFC) subsystem, a WiFi communication subsystem, etc.), and/or any other communication components that would be apparent to one of skill in the art in possession of the present disclosure. While a specific HCI correlation system 300 has been illustrated and described, one of skill in the art in possession of the present disclosure will recognize that an HCI correlation system provided according to the teachings of the present disclosure may be provided by a variety of components and/or components configurations that will fall within the scope of the present disclosure as well. Furthermore, while referred to as an "HCI correlation system", the HCI correlations discussed herein may be provided by an HCI correlation service running on any of a variety of hardware known in the art.

Figure 4:
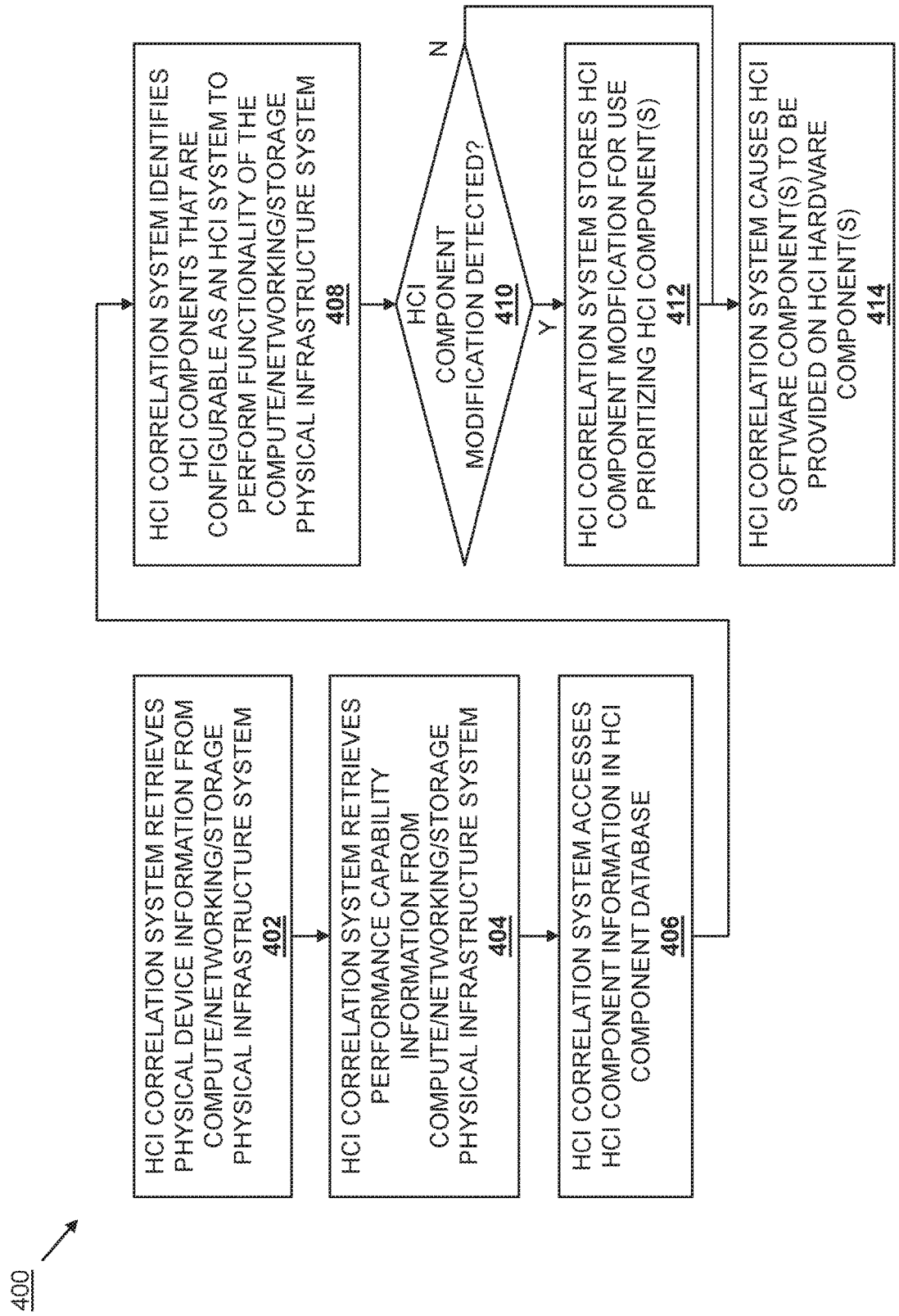
FIG. 4 is a flow chart illustrating an embodiment of a method for correlating an HCI system to a computer/networking/storage infrastructure.

Referring now to FIG. 4, an embodiment of a method 400 for correlating an HCI system to a computer/networking/storage infrastructure is illustrated. As discussed below, embodiments of the systems and methods of the present disclosure provide for the provisioning of HCI systems to replace traditional compute/networking/storage physical infrastructure systems. However, one of skill in the art will recognize that the systems and methods of the present disclosure may also provide for the provisioning of HCI systems to provide new functionality (e.g., for a new datacenter), HCI systems to expand existing functionality (e.g., in an existing datacenter), etc. In some embodiments, an HCI correlation system may operate to gather physical device information about a compute/networking/storage physical infrastructure system, as well as performance capability information about that compute/networking/storage physical infrastructure system. The HCI correlation system may then access an HCI component database that is fed information about HCI components that may include HCI component capabilities, HCI component applicabilities, HCI component positioning strategies, and/or any other HCI component information that would be apparent to one of skill in the art in possession of the present disclosure. The HCI correlation system then uses the physical device information and performance capability information about the compute/networking/storage physical infrastructure system in order to correlate the compute/networking/storage physical infrastructure to a plurality of HCI components for an HCI system that is capable of performing the functionality of the compute/networking/storage physical infrastructure system. The HCI correlation system may then size the HCI system/components in order to support migration of the compute/networking/storage physical infrastructure system to the HCI system, and cause at least one HCI software component included in the plurality of HCI components to be provided on at least one HCI hardware component included in the plurality of HCI components.

In addition, the HCI correlation system may track HCI component modifications made to the HCI components that are initially identified for the HCI system to make it capable of performing the functionality of the compute/networking/storage physical infrastructure system, and use those HCI component modifications to change the weighting/prioritization of HCI components that is used to select HCI components for an HCI system that can perform the functionality of any particular compute/networking/storage physical infrastructure system. As such, the determination of HCI systems for replacing compute/networking/storage physical infrastructure systems may be optimized by focusing on the specific physical devices and physical device performance capabilities that are being replaced, along with the consideration of HCI component capabilities and positioning strategies. Furthermore, as HCI systems including a variety of HCI components are identified for replacing compute/networking/storage physical infrastructure systems, modifications of those HCI systems prior to their implementation (via the selection of different HCI components) may be used to adjust prioritizations and/or weightings of HCI components that are used to identify HCI components, thus adjusting the identification of HCI components for future HCI systems. As such, a broad portfolio of HCI components may be offered for providing HCI systems to replace compute/networking/storage physical infrastructure systems, with the selection of subsets of those HCI components for any particular HCI system optimized based on the physical device and performance requirements of the existing compute/networking/storage physical infrastructure system, as well as on HCI component positioning requirements that may be set by an HCI system provider.

Figure 5A:
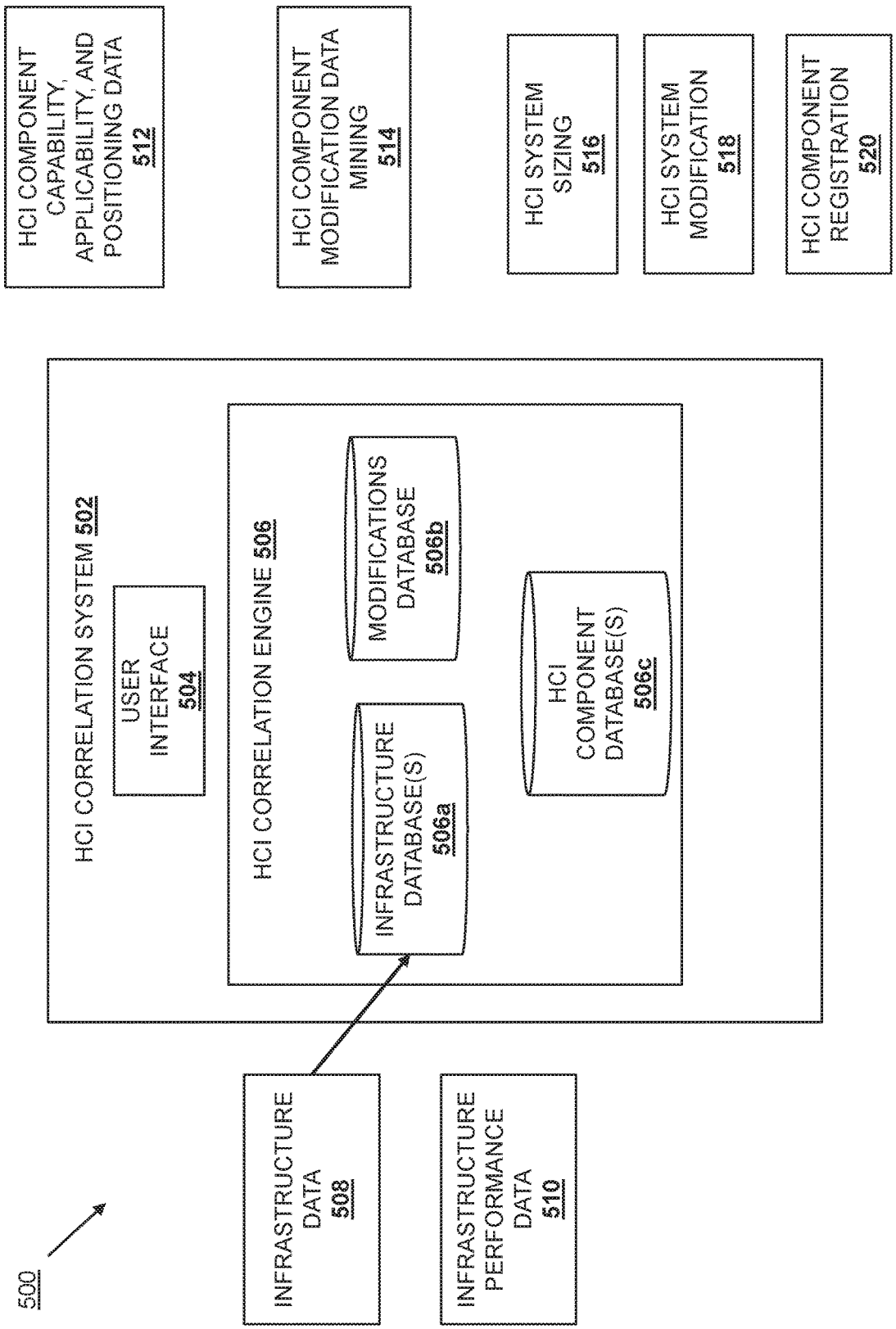
FIGS. 5A-5K provide a schematic view illustrating an embodiment of the operations of the HCI correlation system of FIG. 2 during the method of FIG. 4.

The method 400 may begin at block 402 where an HCI correlation system retrieves physical device information from a compute/networking/storage physical infrastructure system. In an embodiment, at block 402, the infrastructure information sub-engine 304b provided by the HCI correlation engine 304 in the HCI correlation system 206/300 may operate to retrieve physical device information from the compute/networking/storage physical infrastructure system 202a through the network 204 via its communication system 314. For example, the physical device information retrieved at block 402 may include physical device features and/or configurations of the compute/networking/storage physical infrastructure system 202a such as types of physical devices (e.g., All Flash (AF) series type devices available from VMWARE® of Palo Alto, Calif., United States; Hybrid (HY) series type devices available from VMWARE® of Palo Alto, Calif., United States, Non-Volatile Memory express (NVMe) type devices, etc.), resiliency levels of physical devices (e.g., those with mirroring capabilities, those with error correction capabilities, etc.), supported configurations of physical devices (e.g., disaggregated physical devices, converged infrastructure devices, etc.), a number of nodes in a cluster, and/or any other physical device information that would be apparent to one of skill in the art in possession of the present disclosure. In some examples, a user of the compute/networking/storage physical infrastructure system 202a may provide the physical device information via a web portal hosted by the HCI correlation system 206/300 (e.g., via a questionnaire available on that web portal), although automated physical device information retrieval by the HCI correlation system 206/300 (e.g., via the network 204) will fall within the scope of the present disclosure as well. FIG. 5A provides an operational flow 500 that illustrates infrastructure data 508 being provided in infrastructure database(s) 506a utilized by an HCI correlation engine 506 provided by an HCI correlation system 502.

The method 400 may then proceed to block 404 where the HCI correlation system retrieves performance capability information from the compute/networking/storage physical infrastructure system. In an embodiment, at block 404, the infrastructure performance sub-engine 304c provided by the HCI correlation engine 304 in the HCI correlation system 206/300 may operate to retrieve performance capability information from the compute/networking/storage physical infrastructure system 202a through the network 204 via its communication system 314. For example, the performance capability information retrieved at block 404 from the compute/networking/storage physical infrastructure system 202a may include throughput capabilities, latency capabilities, and/or other capabilities of relatively small, medium, and large configurations of different types of compute/networking/storage physical infrastructure systems (e.g., those including AF series type devices available from VMWARE® of Palo Alto, Calif., United States; HY series type devices available from VMWARE® of Palo Alto, Calif., United States, Non-Volatile Memory express (NVMe) type devices, etc.) In other examples, the performance capability information retrieved at block 404 from the compute/networking/storage physical infrastructure system 202a may include data describing workloads (e.g., general purpose virtualized workloads, Virtual Desktop Infrastructure (VDI) workloads, Structured Query Language (SQL)/ORACLE®/SAP® business application workloads, etc.) associated with the compute/networking/storage physical infrastructure systems.

Figure 5B:
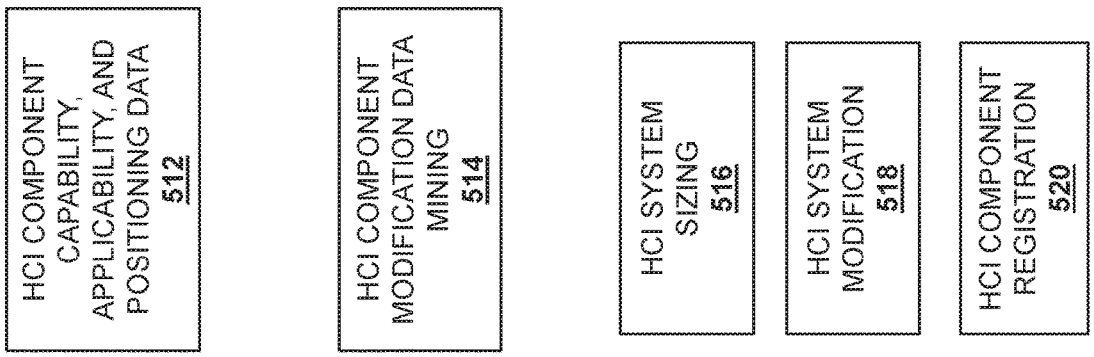
Figure 5B:
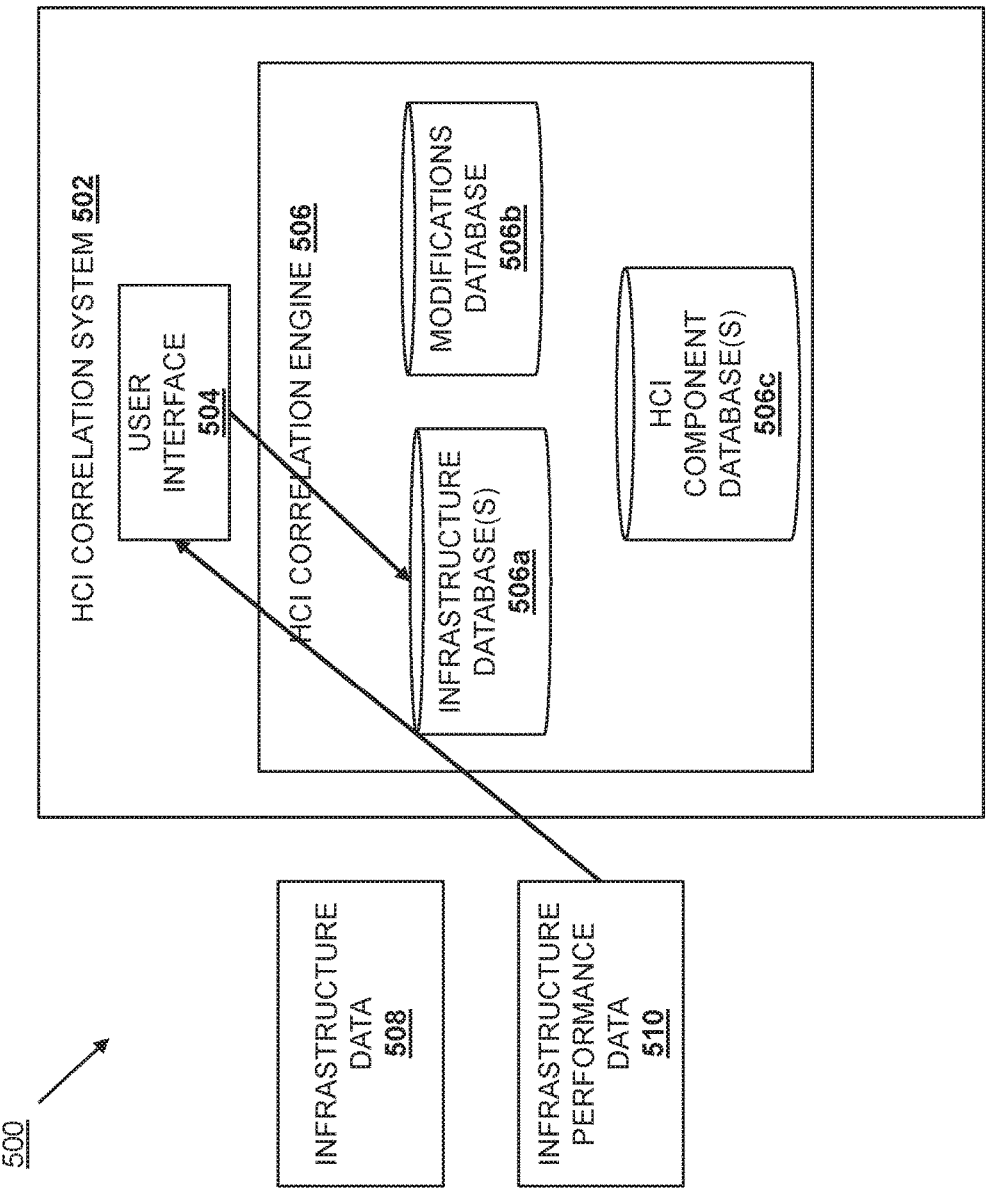

In yet other examples, the performance capability information retrieved at block 404 from the compute/networking/storage physical infrastructure system 202a may include use-cases (e.g., data center converged infrastructure use cases, disaggregated Software Defined Storage (SDS) use cases, Remote Office/Brand Office (ROBO) use cases, etc.) associated with the compute/networking/storage physical infrastructure systems. In yet other examples, the performance capability information retrieved at block 404 from the compute/networking/storage physical infrastructure system 202a may include service support models (e.g., single StockKeeping Unit (SKU) service support models, contextual service support models, disjointed service support models, vendor-led Life Cycle Management (LCM) service support models and/or Service Level Agreement (SLA) service support models, customer-driven LCM service support models, etc.) associated with the compute/networking/storage physical infrastructure systems. However, any other performance capability information that would be apparent to one of skill in the art in possession of the present disclosure may be retrieved at block 404 while remaining within the scope of the present disclosure. In specific examples, the infrastructure performance sub-engine 304c that retrieves the performance capability information at block 404 may be provided by a LIVEOPTICS® system available from DELL® Inc. of Round Rock, Tex., United States, although other sub-engines for retrieving performance capabilities information will fall within the scope of the present disclosure as well. FIG. 5B provides the operational flow 500 that illustrates infrastructure performance data 510 being collected via a user interface 504 provided by the HCI correlation system 502 and provided in the infrastructure database(s) 506a utilized by the HCI correlation engine 506 provided by the HCI correlation system 502.

The method 400 may then proceed to block 406 where the HCI correlation system accesses HCI component information in an HCI component database. While not explicitly illustrated in FIG. 3, some embodiments of the method 400 may include the HCI component information sub-engine 304d provided by the HCI correlation engine 304 in the HCI correlation system 300 receiving HCI component information about HCI components that are available to provide the HCI systems discussed below that can perform the functionality of the compute/network/storage physical infrastructure systems; and storing that HCI component information in the HCI component database 310. In some embodiments; HCI component information may include an information about the capabilities of HCI software and/or hardware components that would be apparent to one of skill in the art in possession of the present disclosure. Furthermore, HCI component information may also include HCI component positioning information such as data that maps HCI component positioning strategies for HCI components that may have overlapping capabilities and applicabilities for performing that functionality. For example, for SDS-based infrastructure systems, an existing infrastructure based on VMWARE® products (available from VMWARE® of Palo Alto, Calif., United States) may be mapped to virtual Storage Area Network (vSAN) Ready Nodes (vSRN) products, VxRail products, and/or VxRack products (provided according to the VMWARE® Cloud Foundation (VCF) or a Software Defined Data Center (SDDC)) available from DELL® Inc. of Round Rock, Tex., United States.

In another example, for SDS-based infrastructure systems, an existing infrastructure based on MICROSOFT® products (available from MICROSOFT® Corporation of Redmond, Wash., United States) may be mapped to Storage Spaces Direct Ready Nodes (S2DRN) products, WINDOWS® Server Software-Defined Ready Solutions (RS-WSSD) products; or VxRack AS products available from DELL® Inc. of Round Rock, Tex., United States. In yet another example, for SDS-based infrastructure systems, an existing infrastructure based on mixed products may be mapped to VxFlex products, VxRack Flex products, and/or XC series products available from DELL® Inc, of Round Rock, Tex., United States. In yet another example, for SDS-based infrastructure systems, an existing infrastructure based on end-to-end MICROSOFT®-application-to-infrastructure-stack-via-SQL may be mapped to S2DRN products available from DELL® Inc, of Round Rock, Tex., United States.

Figure 5C:
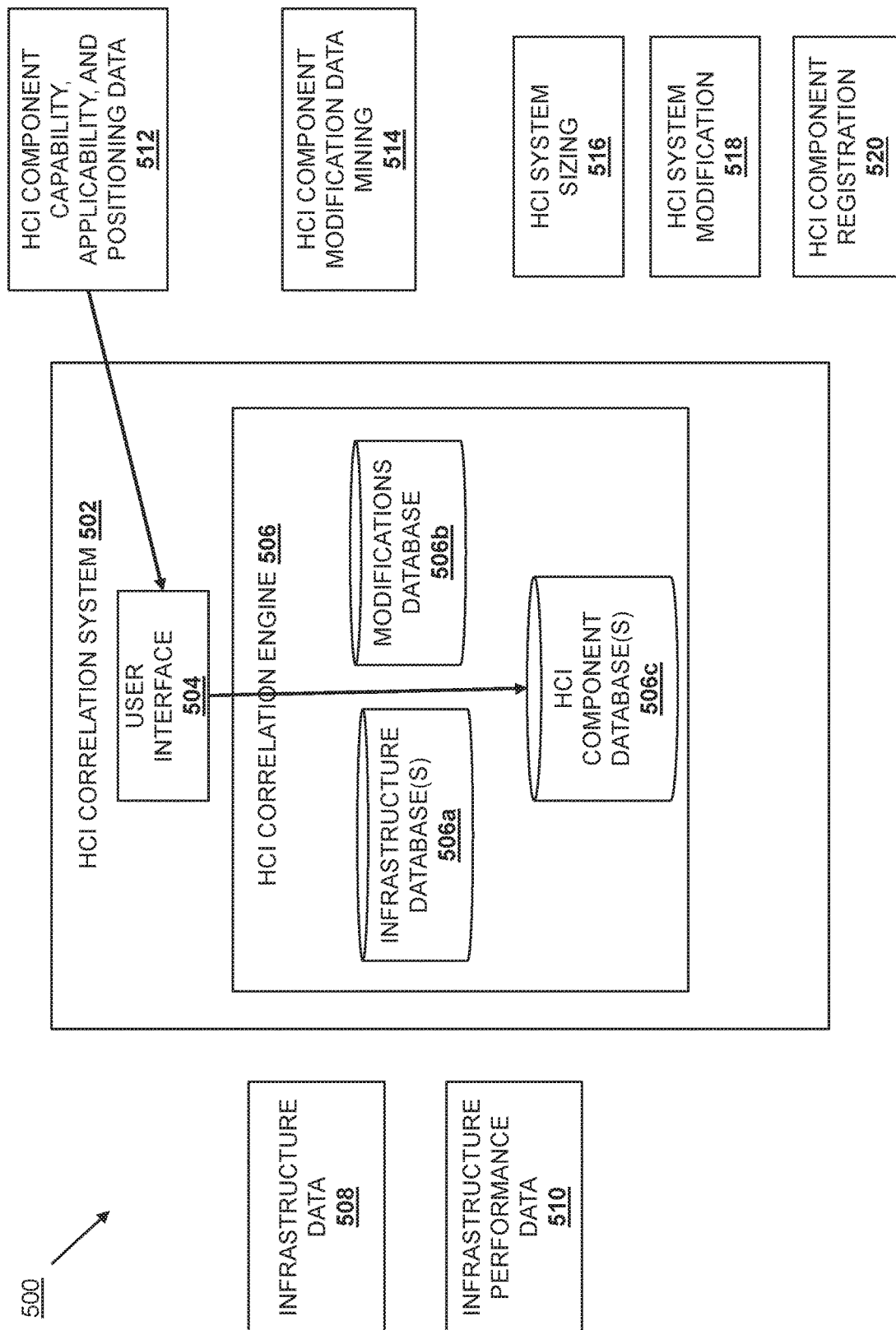

In yet another example, traditional external-storage-based infrastructure systems may be mapped to FlexOS-based or Storage Spaces Direct (S2D)-based disaggregated SDS infrastructure systems for ORACLE®-based and SAP®-based migration use cases. In different embodiments, HCI component positioning information may prioritize some HCI components over other HCI components (e.g., OpenStack cluster migration components over VxFlex or XC-based HCI components available from DELL® Inc. of Round Rock, Tex., United States.) Furthermore, the HCI component information stored in the HCI component information database 312 may be retrieved from a variety of data sources, captured from previous HCI system provisioning flows, and/or received via a variety of techniques that would be apparent to one of skill in the art in possession of the present disclosure. As such, in embodiments of block 406, the HCI sizer sub-engine 304*a* provided by the HCI correlation engine 304 in the HCI correlation system 206/300 may access the HCI component information stored in the HCI component database 310. FIG. 5C provides the operational flow 500 that illustrates HCI component capability, applicability, and positioning data 512 being collected via the user interface 504 provided by the HCI correlation system 502 and provided in HCI component database(s) 506*c* utilized by the HCI correlation engine 506 provided by the HCI correlation system 502.

The method 400 may then proceed to block 408 where the HCI correlation system identifies HCI components that are configurable as an HCI system to perform functionality of the compute/networking/storage infrastructure system. In an embodiment, at block 408, the HCI sizer sub-engine 304*a* provided by the HCI correlation engine 304 in the HCI correlation system 206/300 uses the physical device information retrieved at block 402 and the performance capability information retrieved at block 404 in order to identify HCI components that are described by the HCI component information in the HCI component database 310 and that are configurable as an HCI system that performs the functionality of the compute/networking/storage physical infrastructure system 202*a*. In a specific example, the identification of the HCI components at block 408 may be influenced by the following high level formula:

$$CSI = fn(ec_1 + iw_1) + (ec_2 + iw_2) + \ldots + (ec_n + iw_n)$$

Where CSI provides an index that influences the identification of HCI components, ec provides a measure of the performance capability of an HCI components, iw provides a weight or prioritization of HCI components, and m is the total of number of HCI components being identified. The sample algorithm flow discussed below may provide data for the CSI via the use of performance data, sizing data, capability data, and applicability data that may be collectively formulated to determine the values of ec, while the values of iw may be determined via the HCI component positioning strategies discussed herein that may include components quotas and prioritizations that apply multiples to the ec variables to identify HCI components for an HCI system.

As such, the use of the physical device information and performance capability information retrieved from the compute/networking/storage physical infrastructure system 202*a* with the HCI component information stored in the HCI component database 310 provides for the dynamic identification of HCI components based on a variety of factors, with weights/prioritizations applied to those factors and capable of dynamic adjustment as well (e.g., if a user of the compute/networking/storage physical infrastructure system 202*a* has preferences for SDS technology, HCI components providing SDS technology may be weighted/prioritized higher than non-SDS technology HCI components.) The sample algorithm flow below provides one example of how a variety of HCI components may be available, and one of skill in the art in possession of the present disclosure will recognize how each of these factors may be associated with a variety of weights/prioritizations in order to provide for the identification of a variety of HCI components at block 408:

Physical device infrastructure system requirements: sizing and performance
    sizing: cache vs. capacity ratio||rack space||power consumption
    performance: throughput||latency||performance per watt
HCI components: capability||applicability||positioning
    capability: type of devices||level of resiliency||supported configurations||number of nodes||support hypervisor-||container support||throughput and latency configurations
    applicability: workloads||use-cases||service-support model
    positioning: HCI component type & Ground Theory Method (GTM)
    HCI component type
        if (hypervisor=$ESX_i$)
            if (operational model=buy)
                HCI component type=VxRail||VxRack||VxBlock
            else
                HCI component type=VSRN||PE+VSAN+NSX+VCF SKU
        else if (hypervisor!=ESXi)
            if (operational model=buy)
                HCI component type=VxRack AS||VxRack Flex||XC
            else
                HCI component type=S2DRN||PE+Flex OS
    GTM=Quota & corporate positioning
Mapped HCI component: physical device infrastructure system requirements & HCI components HCI sizer generated HCI system: mapped HCI component*sizing and performance requirements HCI ordering tool: import generated HCI system into HCI system building tool HCI system confirmation registration: import generated HCI system and order details with physical device infrastructure system details to registration sites The positioning portion of the algorithm above provides an example of the HCI component positioning utilized to identify HCI components for an HCI system as discussed below. For example, the algorithm provides that if an ESXi hypervisor is selected and the operational model is "buy", HCI components such as VxRail, VxRack, or VxBlock may be identified, while if the operational model is not "buy" (e.g., the operational model is "build"), HCI components such as VSRN or POWEREDGE® with VSAN, NSX, and VCT SKU are identified. Similarly, the algorithm provides that if a non-ESXi hypervisor is selected and the operational model is "buy", HCI components such as VxRack Azure Stack (AS), VxRack Flex, or XC are identified, while if the operational model is not "buy" (e.g., the operational model is "build"), HCI components such as S2DRN, or POWEREDGE® with FlexOS are identified. While a specific example of component positioning is provided above, one of skill in the art in possession of the present disclosure will recognize that component positioning details may vary based on a variety of factors while remaining within the scope of the present disclosure.

Figure 5D:
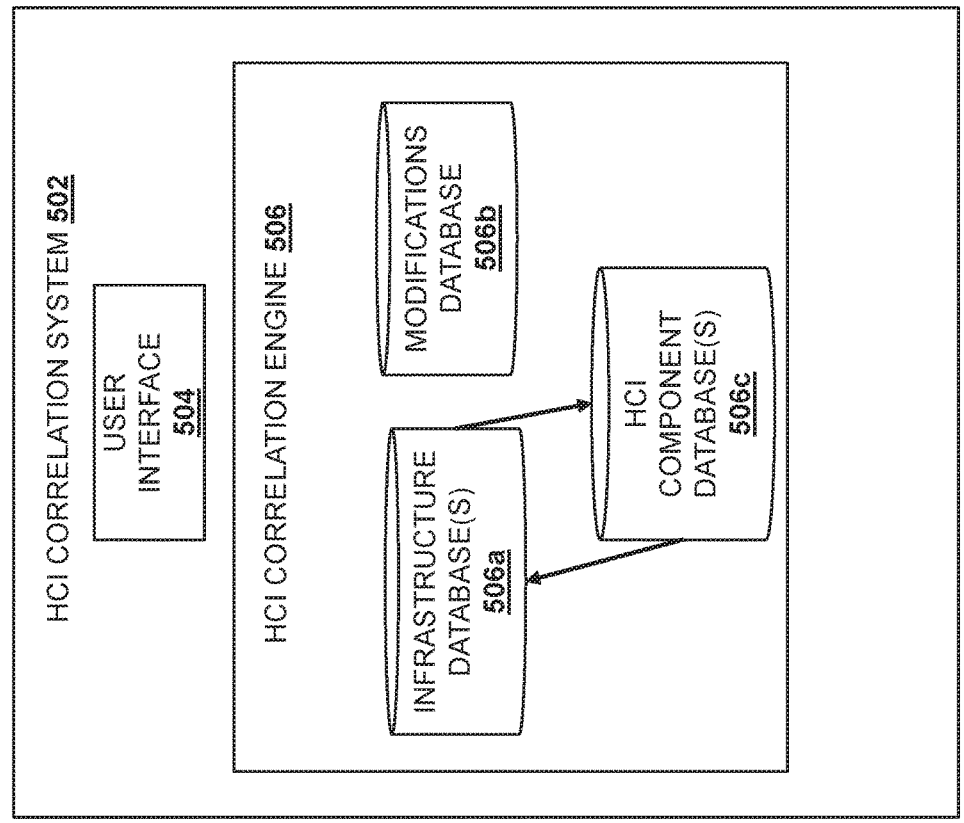
Figure 5E:
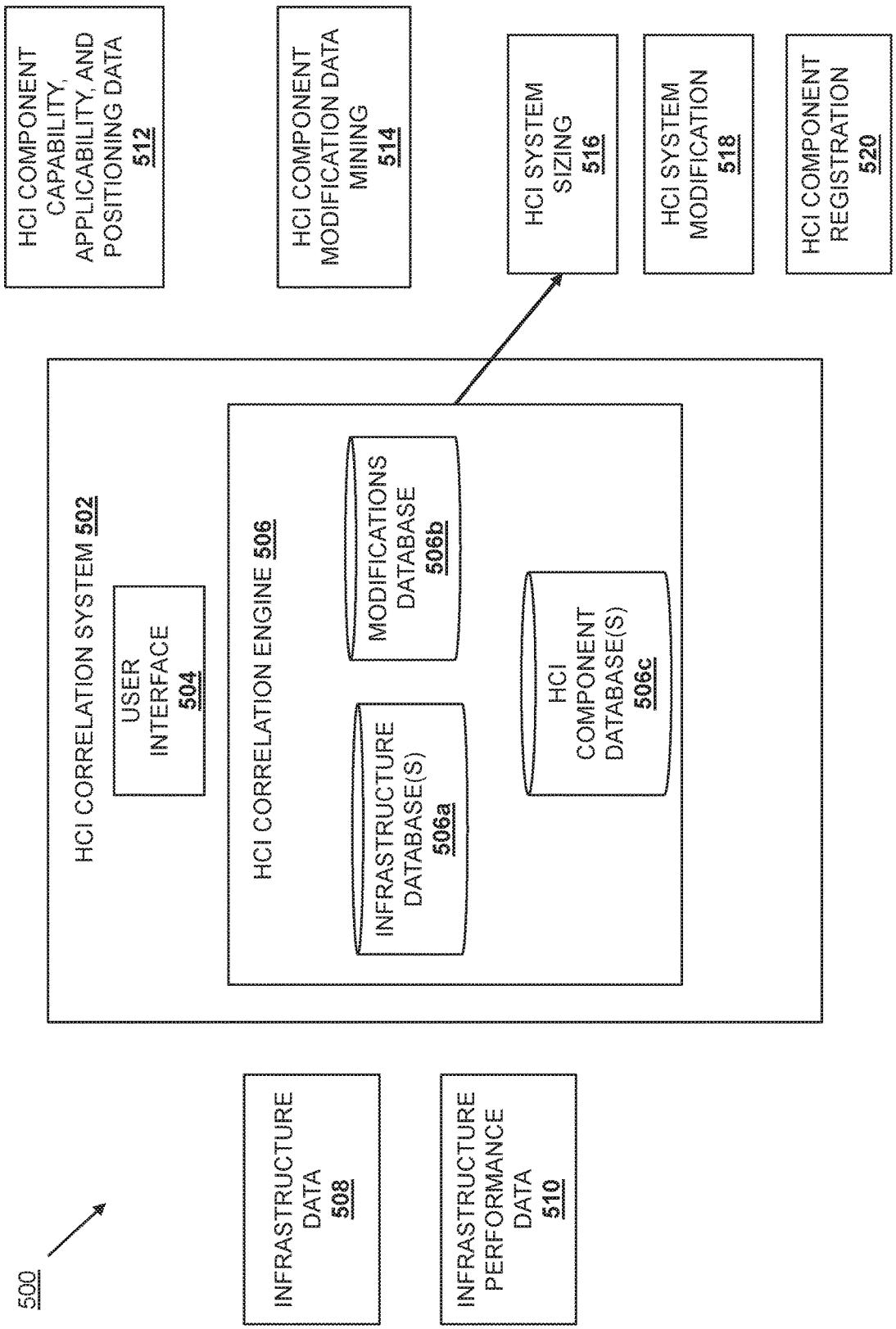

The use of formulas and algorithms like those provided in the examples above allow the HCI correlation engine 304 to utilize weightings and/or prioritizations for various parameters that drive the identification of HCI components to provide an HCI system that is capable of performing the functionality of the compute/networking/storage physical infrastructure system 202a, and that include HCI components that address the requirements of the compute/networking/storage physical infrastructure system 202a, while aligning with HCI component positioning strategies of an HCI component/HCI system provider. As such, the HCI sizer sub-engine 304a may apply formulas/algorithms that factor in the physical device information and performance capability information retrieved at blocks 402 and 404 along, with a variety of weighting/prioritization factors in order to identify a specific set of HCI components that will provide the HCI system that can perform the functionality of the compute/networking/storage physical infrastructure 202a. FIG. 5D provides the operational flow 500 that illustrates the HCI correlation engine 506 provided by the HCI correlation system 502 utilizing the data included in the infrastructure database(s) 506a and the HCI component database(s) 506c in order to identify the HCI components as discussed above. FIG. 5E provides the operational flow 500 that illustrates the HCI correlation engine 506 provided by the HCI correlation system 502 providing the identified HCI components for HCI system sizing 516.

The method 400 may then proceed to decision block 410 where the HCI correlation system determines whether an HCI component modification has been detected. In some embodiments, following the identification of HCI components at block 408, the HCI correlation engine 304 may provide the identified HCI components (e.g., as part of a recommended HCI system) for display on a display device (e.g., provided by a display device in the HCI system 206/300, provided by a display device in a computing system controlled by the user of the compute/networking/storage physical infrastructure system 202a, etc.) In an embodiment, at decision block 410, a viewer of the identified HCI components may provide an HCI component modification that may, for example, replace one or more of the HCI components identified at block 408 with a different HCI component. For example, as discussed below, a user of the compute/networking/storage physical infrastructure system 202a may have preferences for HCI components other than those identified at block 408, and may request the HCI component modification to change any of the identified HCI components to a preferred HCI component, and the HCI correlation engine 304 will detect that HCI component modification at decision block 410.

If, at decision block 410, the HCI correlation system determines that an HCI component modification has been detected, the method 400 proceeds to block 412 where the HCI correlation engine 304 stores the HCI component modification for use in prioritizing HCI components. In some embodiments, an HCI component modification may be stored in order to identify "drifts" or other changes from the HCI components identified using the formulas and/or algorithms described above, and as HCI component modifications are detected over many performances of the method 400, that information may be analyzed to determine HCI component trends, adoption, and/or other information that may then be utilized to adjust the weighting and/or prioritization of HCI components identified using those formulas/algorithms so that HCI component identifications may more closely follow those trends, that adoption, etc. As such, at block 412, the HCI correlation engine 304 may detect HCI component modifications provided during any performance of the method 400, store those HCI component modifications in the HCI component modification database 312, and then following any of those performances of the method 400, may analyze the HCI component modification information stored in the HCI component modification database 312. Based on that analysis, the HCI correlation engine 304 may then adjust the formulas and/or algorithms (e.g., the HCI component weightings included therein) utilized by the HCI correlation engine 304 in order to take into account the HCI component modifications by, for example, changing the weighting and/or prioritization of HCI components to reflect the selections of particular HCI components over originally identified HCI components via those HCI component modifications.

Figure 5F:
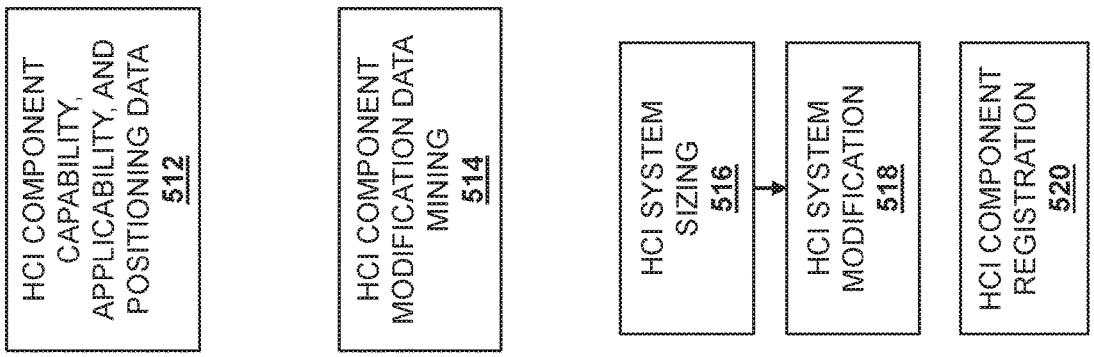
Figure 5F:
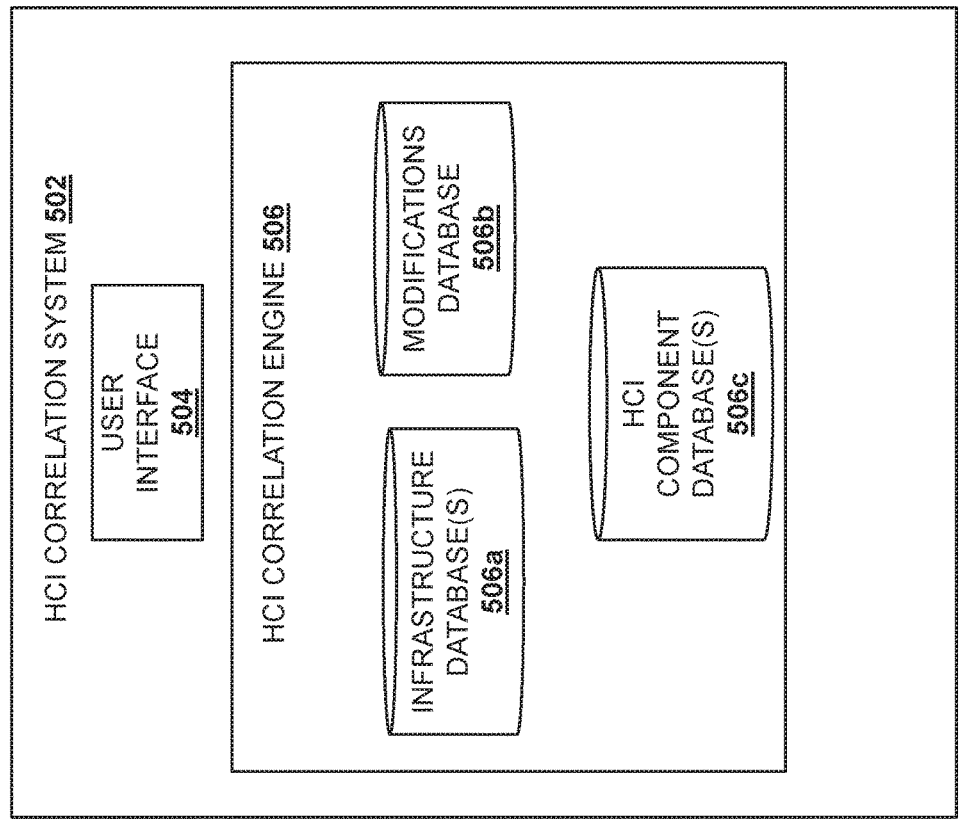
Figure 5F:
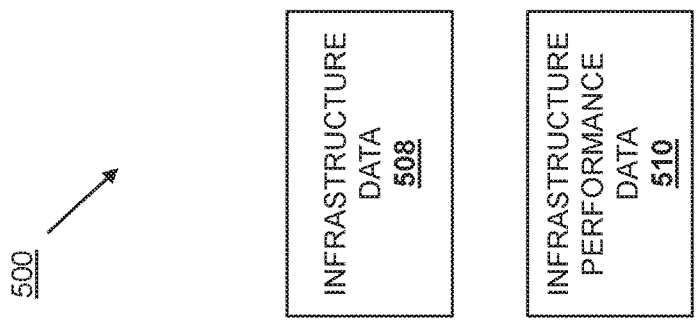
Figure 5G:
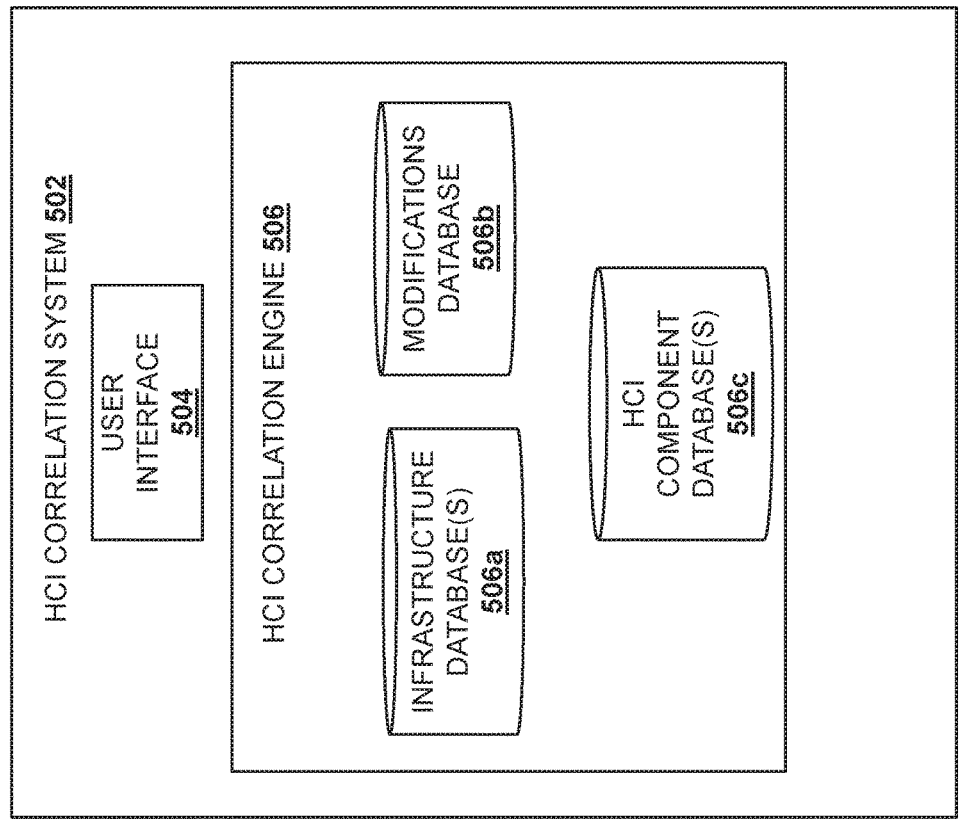
Figure 5G:
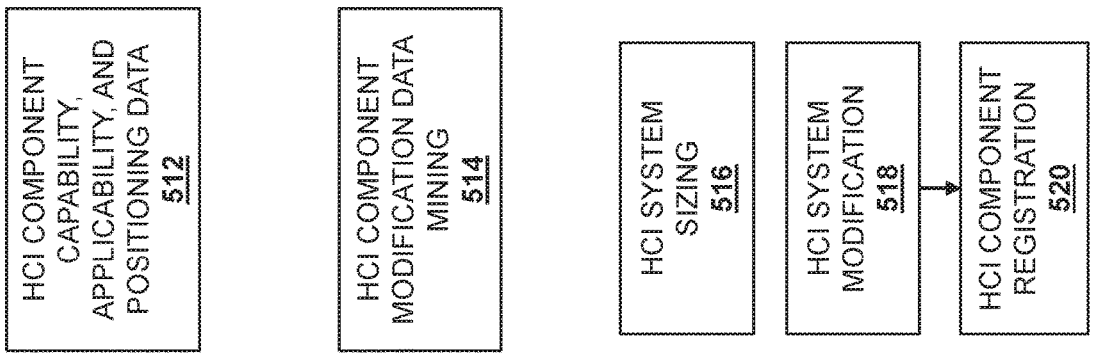
Figure 5G:
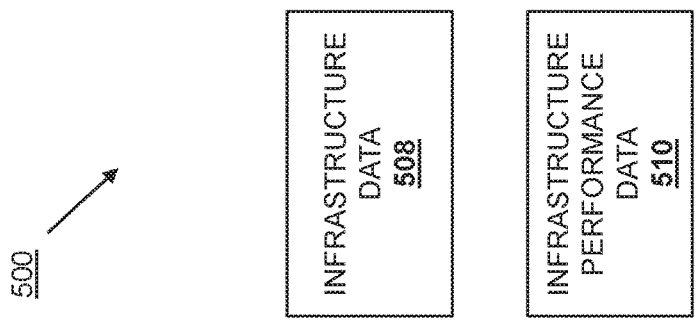
Figure 5H:
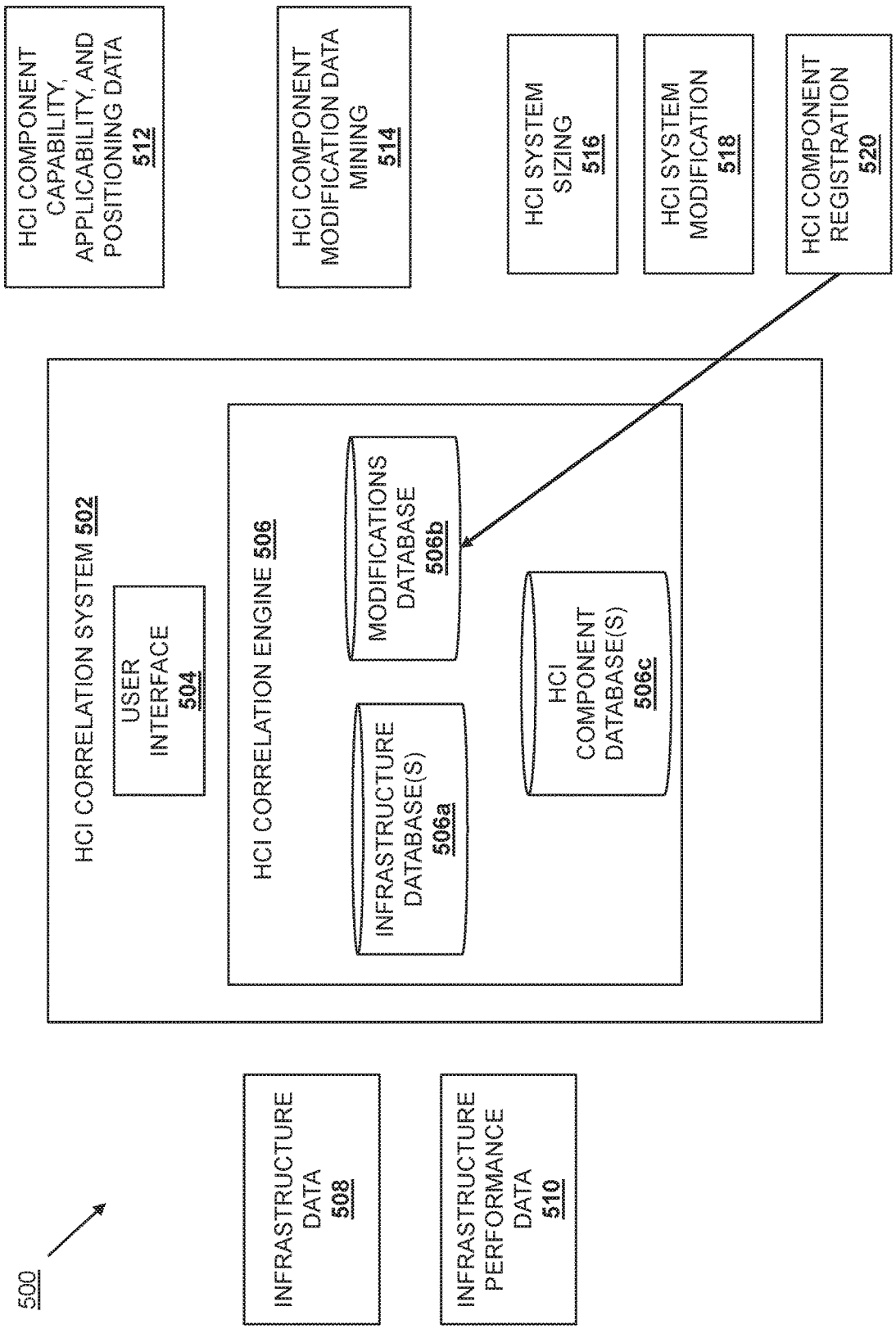
Figure 5I:
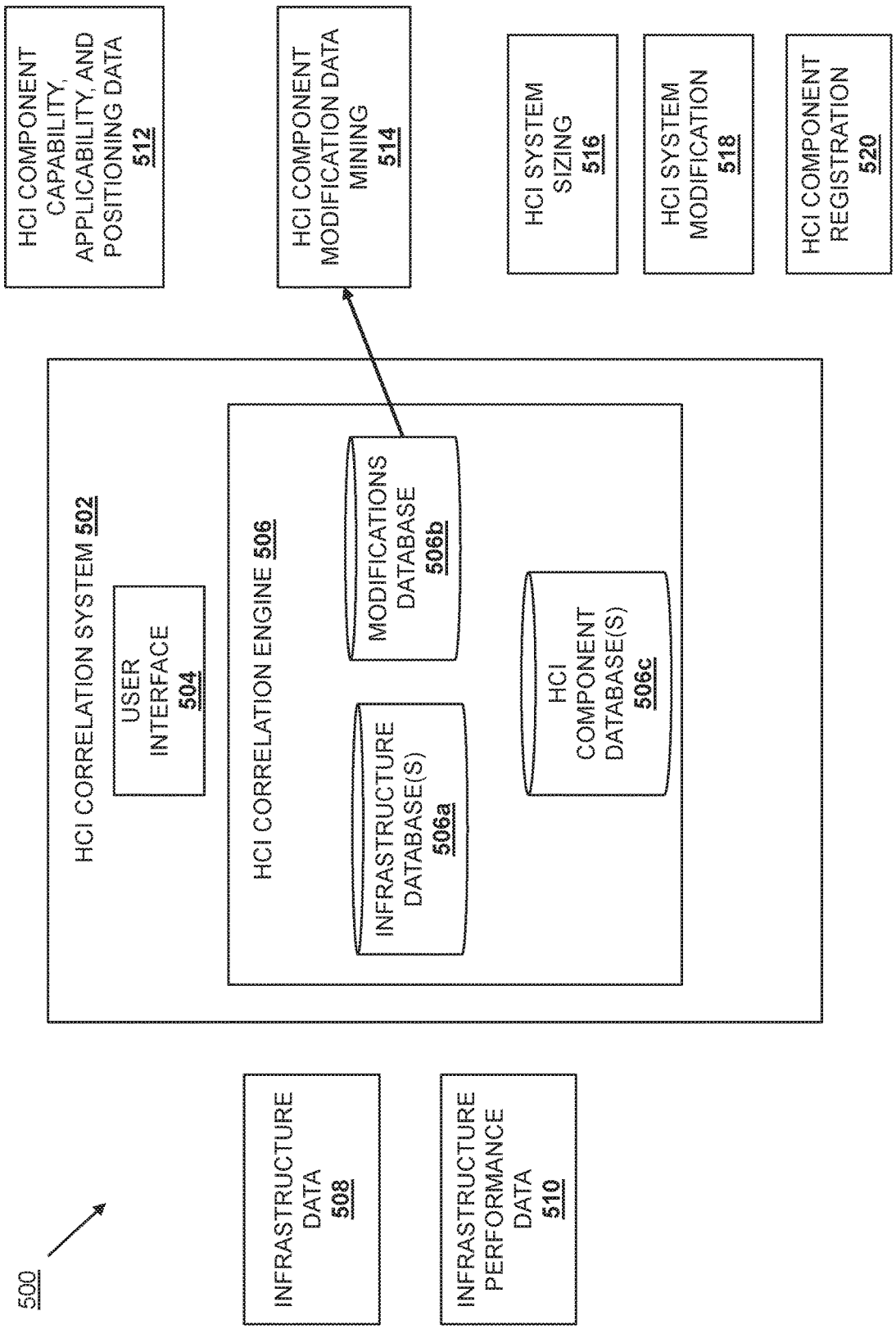
Figure 5J:
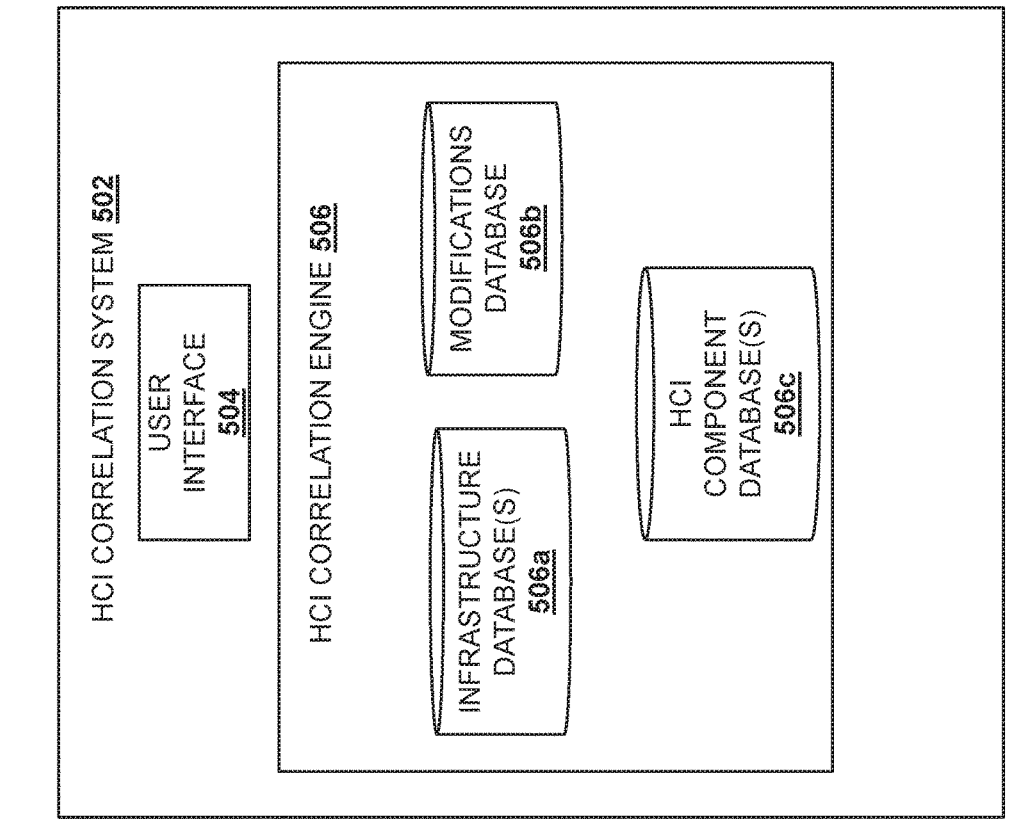
Figure 5K:
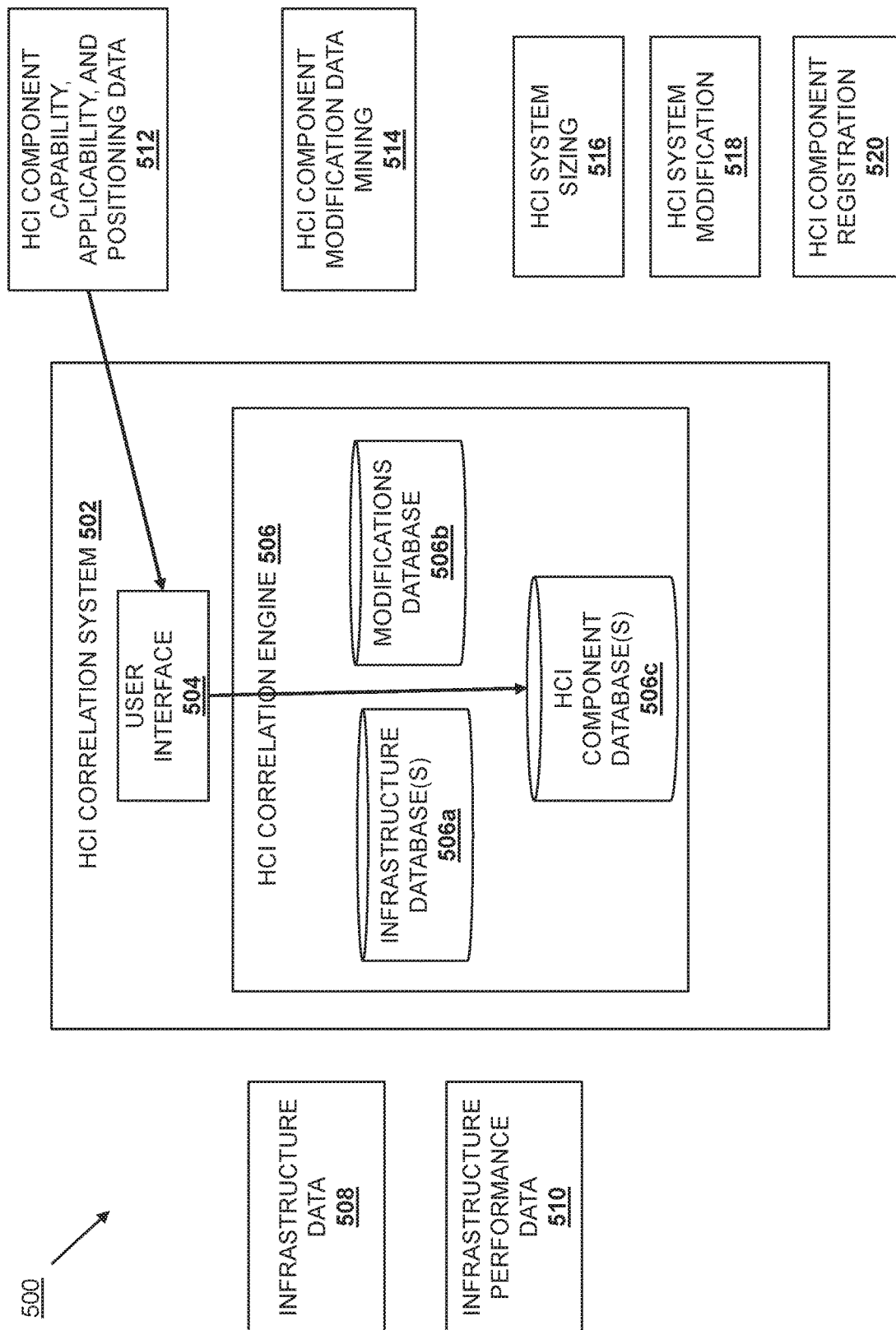

FIG. 5F provides the operational flow 500 that illustrates the sized and identified HCI components being subject to HCI component modification 518, while FIG. 5G provides the operational flow 500 that illustrates the registration 520 of HCI components after the HCI component modification 518. FIG. 5H provides the operational flow 500 that illustrates HCI component modification data being provided to a modifications database 506b utilized by the HCI correlation engine 506, and FIG. 5I provides the operational flow that illustrates the HCI component modification data being mined 514. FIG. 5J provides the operational flow 500 that illustrates the HCI component modification data mining 514 can provide its resulting data to the HCI component capability, applicability, and positioning data 512 (e.g., by changing the interface weighting as discussed above), and FIG. 5K provides the operational flow 500 that illustrates that HCI component capability, applicability, and positioning data 512 (e.g., with the modified interface weighting) being provided through the user interface 504 to the HCI component database(s) 506c in the HCI correlation engine 506 for use in subsequent identifications of HCI systems/components, If, at decision block 410, the HCI correlation system determines that no HCI component modification has been detected, or following block 412, the method 400 proceeds to block 412 where the HCI correlation system causes HCI software component(s) to be provided on HCI hardware component(s). In an embodiment, at block 412, the HCI correlation engine 304 may operate to cause at least one HCI software component (which was identified at block 408 or provided via an HCI component modification at decision block 410) to be provided on at least one HCI hardware component (which was identified at block 408 or provided via an HCI component modification at decision block 410.) As such, an HCI system may be created at block 412 by installing HCI software component(s) on HCI hardware components in order to provide the HCI system in a configuration that is capable of performing any of the functionality of the compute/networking/storage physical infrastructure 202a. In addition, any new functionality or increased/expanded functionality (relative to that which the compute/networking/storage physical infrastructure system 202a is capable of) may be specified for the HCI system as well, allowing for the identification of HCI software components and/or HCI hardware components that provide for a new level of functionality (e.g., for a new datacenter) or a higher/expanded level of functionality (e.g., for an existing datacenter) than that provided by the compute/networking/storage physical infrastructure system 202a.

Thus, systems and methods have been described that provide for the identification of HCI components for an HCI system in order to provide an HCI system that is capable of performing the functionality of an existing compute/networking/storage physical infrastructure system. The systems and methods of the present disclosure provide the ability to determine the most suitable HCI components for providing such an HCI system via the dynamic mapping of performance metrics and compute/networking/storage physical infrastructure requirements with HCI component capabilities, applicabilities, and positioning. Furthermore, the adoption and selection trends of HCI components may be captured during the creation of such HCI systems via the analysis of HCI component modifications made to the HCI components identified via the systems and methods of the present disclosure, which allows for the HCI component identifications to be improved upon in light of those adoption and selection trends via changes in the weighting and prioritization of HCI components that influences the identification of HCI components for future HCI systems created according to the HCI component identification of the present disclosure. As such, the automatic creation of HCI systems to replace compute/networking/storage physical infrastructures is provided, while simplifying the creation of such HCI systems from a wide variety of available HCI components in order to provide properly sized HCI systems having appropriate costs, while enforcing HCI component positioning strategies generated by HCI component providers in order to implement desired HCI components in those HCI systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Hyper-Converged Infrastructure (HCI)/physical infrastructure correlation system, comprising:
   a compute/networking/storage physical nfrastructure system; and
   a Hyper-Converged Infrastructure (HCI) correlation system that is coupled to the computer/networking/storage infrastructure system via a network, wherein the HCI correlation system is configured to:
      retrieve, through the network from the compute/networking/storage physical infrastructure system, physical device information about respective physical devices included in the compute/networking/storage physical infrastructure system;
      retrieve, through the network from the compute/networking/storage physical infrastructure system, performance capability information of the respective physical devices included in the compute/networking/storage physical infrastructure system;
      access, via an HCI component database, HCI component information;
      identify, from the HCI component information and using the physical device information and the performance capability information, a plurality of HCI components that are configurable as an HCI system to perform functionality that is provided by the respective physical devices included in the compute/networking/storage physical infrastructure system; and
      cause, in response to identifying the plurality of HCI components, at least one HCI software component included in the plurality of HCI components to be provided on at least one HCI physical component included in the plurality of HCI components.

2. The system of claim 1, wherein the physical device information about the respective physical devices included in the compute/networking/storage physical infrastructure system includes physical device sizes of the respective physical devices and physical device power consumption of the physical devices.

3. The system of claim 1, wherein the performance capability information of the respective physical devices included in the computer/networking/storage physical infrastructure system includes physical device processing capabilities of the physical devices, physical device availability capabilities of the physical devices, and physical device workload capabilities of the physical devices.

4. The system of claim 1, wherein the HCI component information includes HCI component prioritization information that prioritizes at least one first HCI component over at least one second HCI component that includes the same HCI component type as the at least one first HCI component, and wherein the at least one first HCI component is included in the plurality of HCI components that are identified using the HCI component information and the at least one second HCI component is not included in the plurality of HCI components that are identified using the HCI component information based on the HCI component prioritization information.

5. The system of claim 1, wherein the HCI correlation system is configured to:
   detect, following the identification of the plurality of HCI components, at least one HCI component modification to at least one of the plurality of HCI components; and
   store the at least one HCI component modification in an HCI component modification database.

6. The system of claim 5, wherein the HCI correlation system is configured to:
   modify, in response to the at least one HCI component modification in the HCI component modification database, a prioritization of at least one first HCI component over at least one second HCI component that includes the same HCI component type as the at least one first HCI component, wherein the modification of the prioritization prioritizes the at least one second HCI component over the at least one first HCI component.

7. An Information Handling System (IHS), comprising:
a processing system; and
a memory system that is coupled to the processing system and that includes instructions that, when executed by the processing system, cause the processing system to provide an HCI correlation engine that is configured to:
retrieve, through a network from a compute/networking/storage physical infrastructure system, physical device information about respective physical devices included in the compute/networking/storage physical infrastructure system;
retrieve, through the network from the compute/networking/storage physical infrastructure system, performance capability information of the respective physical devices included in the compute/networking/storage physical infrastructure system;
access, via an HCI component database, HCI component information;
identify, from the HCI component information and using the physical device information and the performance capability information, a plurality of HCI components that are configurable as an HCI system to perform functionality that is provided by the respective physical devices included in the compute/networking/storage physical infrastructure system; and
cause, in response to identifying the plurality of HCI components, at least one HCI software component included in the plurality of HCI components to be provided on at least one HCI physical component included in the plurality of HCI components.

8. The IHS of claim 7, wherein the physical device information about the respective physical devices included in the compute/networking/storage physical infrastructure system includes physical device sizes of the respective physical devices and physical device power consumption of the physical devices.

9. The IHS of claim 7, wherein the performance capability information of the respective physical devices included in the compute/networking/storage physical infrastructure system includes physical device processing capabilities of the physical devices, physical device availability capabilities of the physical devices, and physical device workload capabilities of the physical devices.

10. The IHS of claim 7, wherein the HCI component information includes HCI component prioritization information that prioritizes at least one first HCI component over at least one second HCI component that includes the same HCI component type as the at least one first HCI component, and wherein the at least one first HCI component is included in the plurality of HCI components that are identified using the HCI component information and the at least one second HCI component is not included in the plurality of HCI components that are identified using the HCI component information based on the HCI component prioritization information.

11. The IHS of claim 7, wherein the HCI correlation engine is configured to:
detect, following the identification of the plurality of HCI components, at least one HCI component modification to at least one of the plurality of HCI components; and
store the at least one HCI component modification in an HCI component modification database.

12. The IHS of claim 11, wherein the HCI correlation engine is configured to:
modify, in response to the at least one HCI component modification in the HCI component modification database, a prioritization of at least one first HCI component over at least one second HCI component that includes the same HCI component type as the at least one first HCI component, wherein the modification of the prioritization prioritizes the at least one second HCI component over the at least one first HCI component.

13. The IHS of claim 7, wherein the HCI correlation engine is configured to:
receive, through the network, the HCI component information; and
store the HCI component information in the HCI component database.

14. A method for correlating an HCI system to a computer/networking/storage infrastructure, comprising:
retrieving, by an HCI correlation system through a network from a compute/networking/storage physical infrastructure system, physical device information about respective physical devices included in the compute/networking/storage physical infrastructure system;
retrieving, by the HCI correlation system through the network from the compute/networking/storage physical infrastructure system, performance capability information of the respective physical devices included in the compute/networking/storage physical infrastructure system;
accessing, by the HCI correlation system via an HCI component database, HCI component information;
identifying, by the HCI correlation system from the HCI component information and using the physical device information and the performance capability information, a plurality of HCI components that are configurable as an HCI system to perform functionality that is provided by the respective physical devices included in the compute/networking/storage physical infrastructure system; and
causing, by the HCI correlation system in response to identifying the plurality of HCI components, at least one HCI software component included in the plurality of HCI components to be provided on at least one HCI physical component included in the plurality of HCI components.

15. The method of claim 14, wherein the physical device information about the respective physical devices included in the compute/networking/storage physical infrastructure system includes physical device sizes of the respective physical devices and physical device power consumption of the physical devices.

16. The method of claim 14, wherein the performance capability information of the respective physical devices included in the compute/networking/storage physical infrastructure system includes physical device processing capabilities of the physical devices, physical device availability capabilities of the physical devices, and physical device workload capabilities of the physical devices.

17. The method of claim 14, wherein the HCI component information includes HCI component prioritization information that prioritizes at least one first HCI component over at least one second HCI component that includes the same HCI component type as the at least one first HCI component, and wherein the at least one first HCI component is included in the plurality of HCI components that are identified using the HCI component information and the at least one second HCI component is not included in the plurality of HCI components that are identified using the HCI component information based on the HCI component prioritization information.

18. The method of claim 14, further comprising:
detecting, by the HCI correlation system following the identification of the plurality of HCI components, at least one HCI component modification to at least one of the plurality of HCI components; and storing, by the HCI correlation system, the at least one HCI component modification in an HCI component modification database.

19. The method of claim 18, further comprising:
modifying, by the HCI correlation system in response to the at least one HCI component modification in the HCI component modification database, a prioritization of at least one first HCI component over at least one second HCI component that includes the same HCI component type as the at least one first HCI component, wherein the modification of the prioritization prioritizes the at least one second HCI component over the at least one first HCI component.

20. The method of claim 14, further comprising:
receiving, by the HCI correlation system through the network, the HCI component information; and storing, by the HCI correlation system, the HCI component information in the HCI component database.

* * * * *